(12) United States Patent
Wesolkowski et al.

(10) Patent No.: US 6,587,585 B1
(45) Date of Patent: Jul. 1, 2003

(54) METHOD OF PARAMETERIZING A THRESHOLD CURVE FOR A BINARIZATION PROGRAM AND AN APPARATUS THEREFOR

(75) Inventors: Slawomir B. Wesolkowski, Kitchener (CA); Cameron W. Woloshyn, Kitchener (CA); Khaled S. Hassanein, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/577,741

(22) Filed: May 23, 2000

(51) Int. Cl.$^7$ .............................. G06K 9/00; G06K 9/62
(52) U.S. Cl. ....................................... 382/172; 382/225
(58) Field of Search ................................. 382/172–224, 382/225–227, 169, 170, 168, 173

(56) References Cited

U.S. PATENT DOCUMENTS

| | | | | |
|---|---|---|---|---|
| 4,991,092 A | * | 2/1991 | Greensite | 382/131 |
| 5,315,409 A | * | 5/1994 | Matsumura et al. | 382/172 |
| 5,351,313 A | * | 9/1994 | Bessho et al. | 382/172 |
| 5,519,789 A | * | 5/1996 | Etoh | 382/225 |
| 5,617,484 A | * | 4/1997 | Wada et al. | 382/172 |
| 5,621,815 A | * | 4/1997 | Talukdar et al. | 382/159 |
| 6,351,566 B1 | * | 2/2002 | Zlotnick | 382/237 |
| 6,411,737 B2 | * | 6/2002 | Wesolkowski et al. | 382/237 |

\* cited by examiner

*Primary Examiner*—Wenpeng Chen
(74) *Attorney, Agent, or Firm*—Michael Chan

(57) ABSTRACT

A method of processing a document comprises the steps of (a) scanning a document to obtain gray scale image data associated with the document, (b) generating a two-dimensional histogram based upon the gray scale image data obtained in step (a), (c) applying a clustering algorithm to the two-dimensional histogram to determine a set of cluster center parameters associated with a first cluster of pixels and a set of cluster center parameters associated with a second cluster of pixels, (d) parameterizing a threshold curve associated with a binarization program based upon the set of cluster center parameters associated with the first cluster of pixels and the set of cluster center parameters associated with cluster of pixels, and (e) applying the binarization program to the gray scale image data associated with the document using the parameterized threshold curve obtained in step (d) to provide a binarized image data representative of a binary image of the document. Preferably, step (d) includes the steps of (d-1) calculating an average value associated with the first and second clusters of pixels, and (d-2) parameterizing at least a portion of the threshold curve based upon the average value calculated in step (d-1). The clustering algorithm includes a k-means clustering algorithm. The one cluster of pixels is representative of background of the document and the other cluster of pixels is representative of foreground of the document. One cluster of pixels is located above the other cluster of pixels. The above cluster of pixels is representative of background of the document and the other cluster of pixels is representative of foreground of the document.

12 Claims, 6 Drawing Sheets

METHOD OF PARAMETERIZING A THRESHOLD CURVE FOR A BINARIZATION PROGRAM AND AN APPARATUS THEREFOR

BACKGROUND OF THE INVENTION

The present invention relates to binarization programs, and is particularly directed to a method of parameterizing a threshold curve for a binarization program for use in an image-based document processing system such as an image-based check processing system.

In known check processing applications in which gray scale image data is obtained from scanning a bank check, two or more binarization programs may be applied to the same gray scale image data to extract a corresponding number of binary images of the check. The extracted binary images are then usually compared to identify the binary image of the best image quality. A disadvantage in applying two or more binarization programs to gray scale image data to extract a corresponding number of binary images of the check is that computational costs are relatively high. It would be desirable to optimize parameters of a binarization program on either a per image basis or a class of images such that only the one binarization program need be run.

SUMMARY OF THE INVENTION

In accordance with one aspect of the present invention, a method of processing a document comprises the steps of (a) scanning a document to obtain gray scale image data associated with the document, (b) generating a two-dimensional histogram based upon the gray scale image data obtained in step (a), (c) applying a clustering algorithm to the two-dimensional histogram to determine a set of cluster center parameters associated with a first cluster of pixels and a set of cluster center parameters associated with a second cluster of pixels, (d) parameterizing a threshold curve associated with a binarization program based upon the set of cluster center parameters associated with the first cluster of pixels and the set of cluster center parameters associated with the second cluster of pixels, and (e) applying the binarization program to the gray scale image data associated with the document using the parameterized threshold curve obtained in step (d) to provide a binarized image data representative of a binary image of the document.

Preferably, step (d) includes the steps of (d-1) calculating an average value associated with the first and second clusters of pixels, and (d-2) parameterizing at least a portion of the threshold curve based upon the average value calculated in step (d-1). The clustering algorithm includes a k-means clustering algorithm. The one cluster of pixels is representative of background of the document and the other cluster of pixels is representative of foreground of the document. One cluster of pixels is located above the other cluster of pixels. The above cluster of pixels is representative of background of the document and the other cluster of pixels is representative of foreground of the document.

In accordance with another aspect of the present invention, an apparatus for processing a document comprises means for scanning the document to obtain gray scale image data associated with the document. Means is provided for generating a two-dimensional histogram based upon the gray scale image data. Means is provided for applying a clustering algorithm to the two-dimensional histogram to determine a set of cluster center parameters associated with a first cluster of pixels and a set of cluster center parameters associated with a second cluster of pixels. Means is provided for parameterizing a threshold curve associated with a binarization program based upon the set of cluster center parameters associated with the first cluster of pixels and the set of cluster center parameters associated with the second cluster of pixels. Means is provided for applying the binarization program to the gray scale image data associated with document using the parameterized threshold curve to provide a binarized image data representative of a binary image of the document.

Preferably, the means for parameterizing a threshold curve includes means for calculating an average value associated with the first and second clusters of pixels and means for parameterizing at least a portion of the threshold curve based upon the calculated average value. The clustering algorithm includes a k-means clustering algorithm. The one cluster of pixels is representative of background of the document and the other cluster of pixels is representative of foreground of the document. One cluster of pixels is located above the other cluster of pixels. The above cluster of pixels is representative of background of the document and the other cluster of pixels is representative of foreground of the document.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

The present invention is directed to an apparatus and method of parameterizing a threshold curve for a binarization program in an image-based document processing system such as an image-based check processing system. The document may be of any type. By way of example, a document in the form of a bank check is processed in accordance with the present invention.

Figure 1:
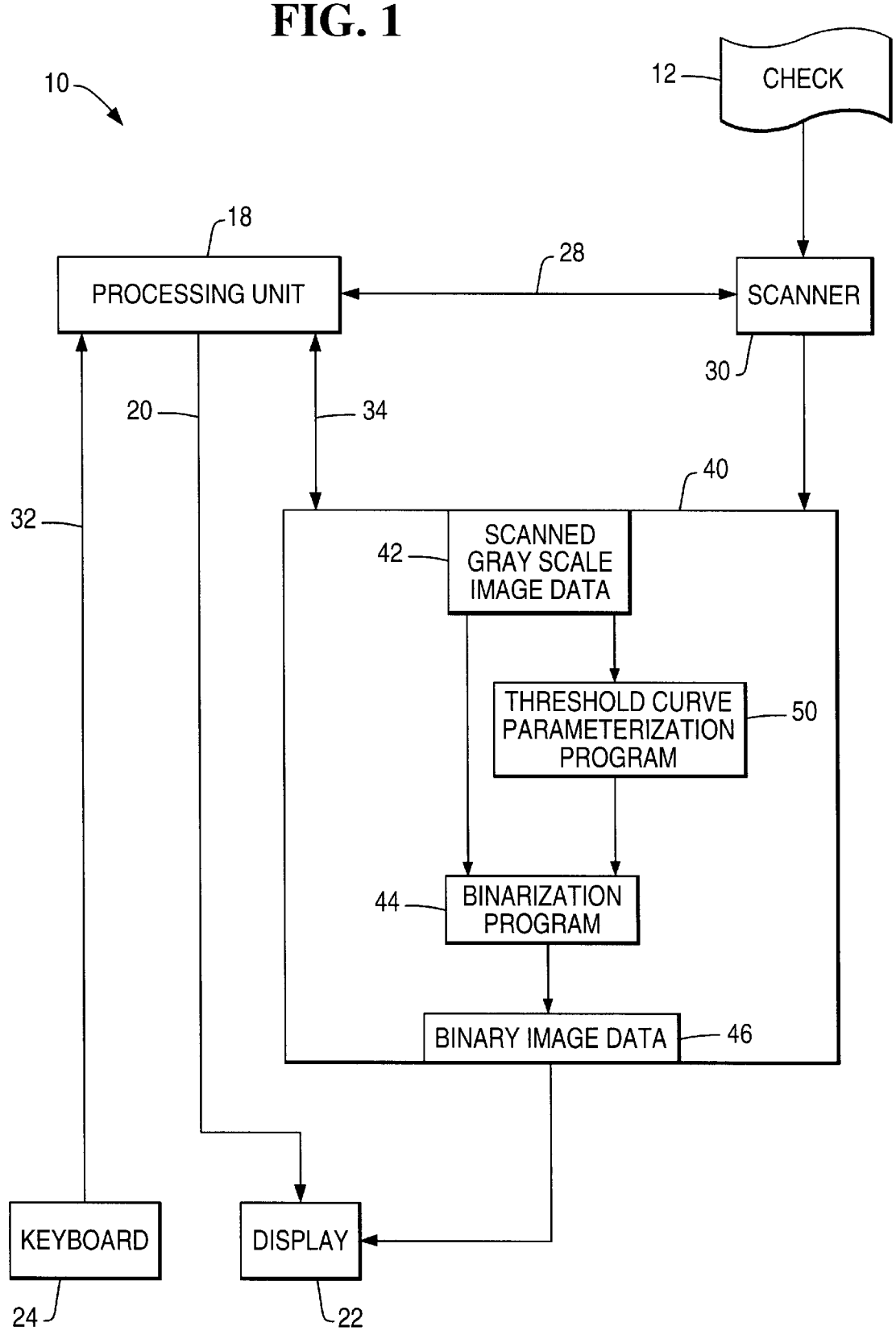
FIG. 1 is a block diagram representation of an image-based check processing system embodying the present invention.

Referring to FIG. 1, an image-based check processing system 10 includes a processing unit 18 which is electrically connected via bus line 20 to a display 22. The processing unit 18 is also electrically connected via bus line 32 to a keyboard 24 and via bus line 34 to a system memory 40. The system memory 40 includes memory space which stores, inter alia, scanned gray scale image data 42, binary image data 46, and a number of application programs.

The application programs stored in the system memory 40 include a binarization program 44. Many different binarization programs are known and, therefore, will not be described herein. The application programs stored in the system memory 40 further include a threshold curve binarization program 50 in accordance with the present invention which will be described in detail later.

The check processing system 10 further includes a scanner device 30 which is electrically connected via bus line 28 to the processing unit 18. Preferably, the processing unit 18 is a microcomputer, and the system memory 40 is a random access type of memory. Suitable microcomputers and memories are readily available in the marketplace. Their structure and operation are well known and, therefore, will not be described.

During operation, the scanner device 30 lifts an image of a bank check 12 when the check is moved past the scanner device. The scanner device 30 produces pixels each pixel having a particular gray level associated therewith. The gray level of the pixel is stored as gray scale image data 42 in the system memory 40 as shown in FIG. 1. The process of lifting an image of the check 12 and storing the image as gray scale image data 42 in system memory 40 is known and, therefore, will not be described. The gray scale image data 42 associated with all the pixels form a gray scale image of the check 12.

After the gray scale image data 42 is stored in the system memory 40, the threshold curve binarization program parameterizes the threshold curve associated with the binarization program 44 in accordance with the present invention which is described hereinbelow. The binarization program 44 then binarizes the gray scale image data 42 to provide corresponding binary image data 46 which is representative of the binary image of the check 12. The corresponding binary image of the check 12 is displayed on the display 22.

Figure 2:
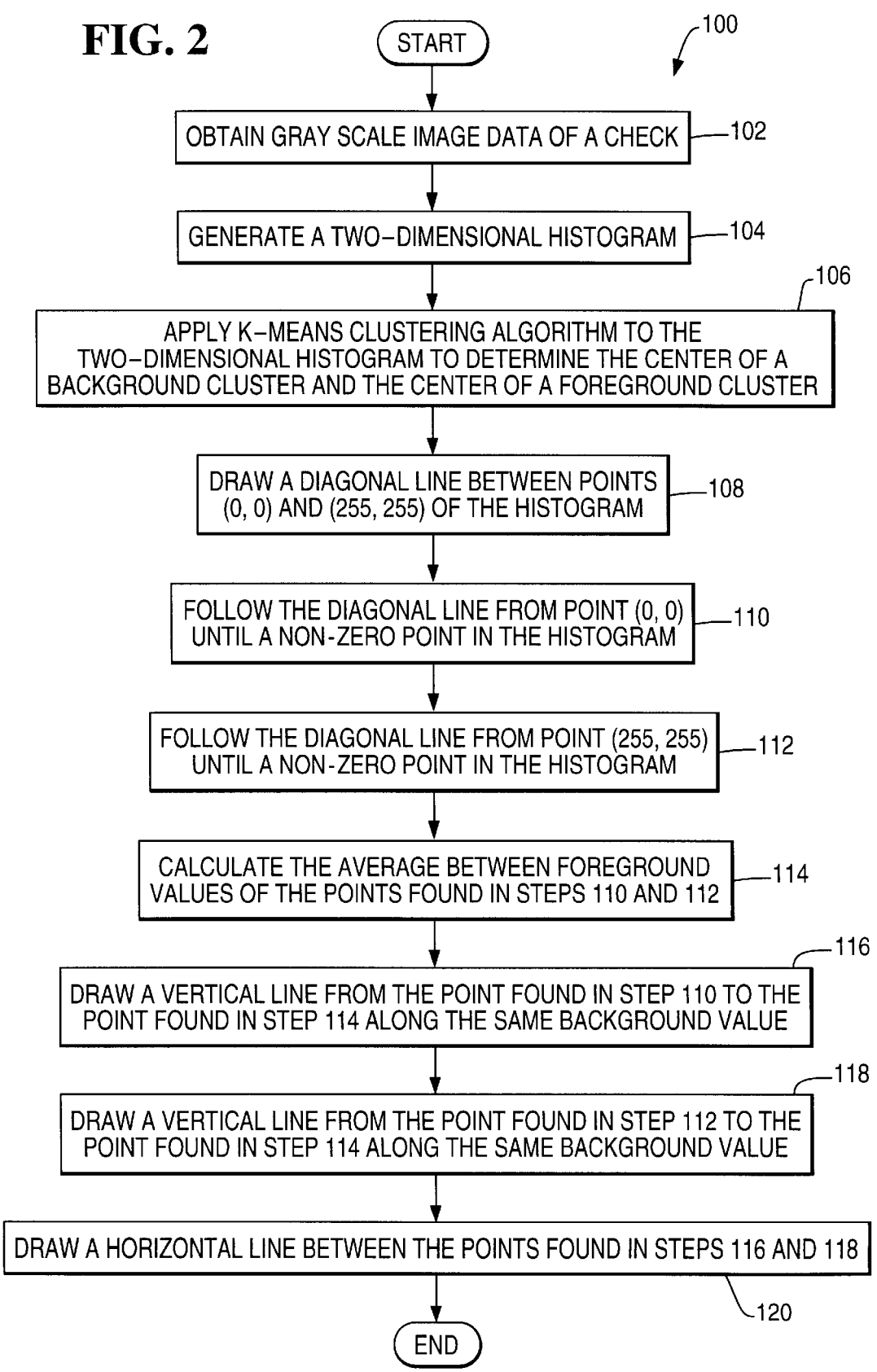
FIG. 2 is a flowchart depicting a process carried out by the system of FIG. 1 to parameterize a threshold curve for a binarization program used in the image-based processing system of FIG. 1.

Referring to FIG. 2, a flowchart 100 depicts processes carried out by the threshold curve binarization program 50 in accordance with the present invention. In step 102, the gray scale image data 42 which has been obtained from the check 12 is stored in the system memory 40. Then, in step 104, a two-dimensional histogram is generated based upon the gray scale image data 42. More specifically, the histogram is constructed by counting the number of pixels that have the same background and foreground values. Foreground values are represented by the value of the pixel itself (call this pixel "A" for example). Background values are obtained by averaging an N×N window centered at pixel "A". A typical value for N is 25. The value at any point on the histogram is equal to the sum of the number of pixels in the gray scale image of the check 12 with these background and foreground values.

Figure 3:
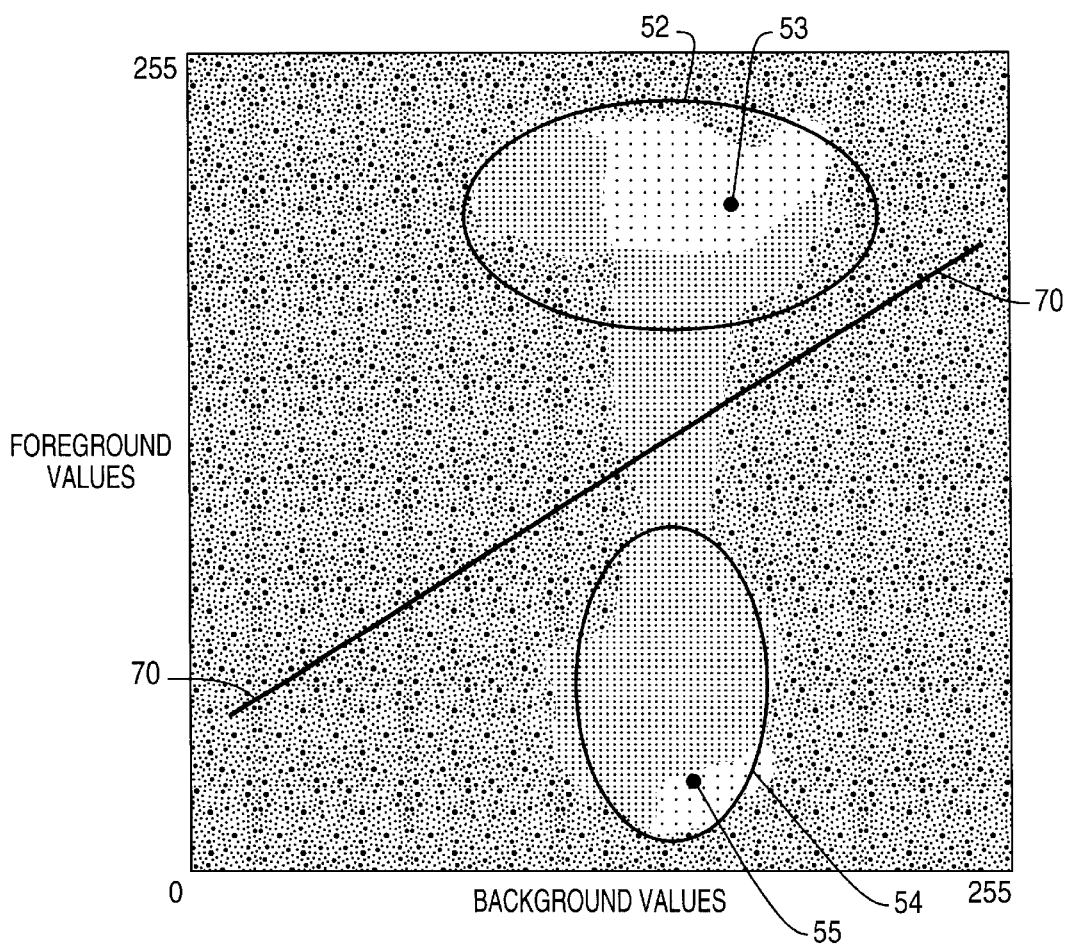
FIG. 3 is an example of a two-dimensional histogram which is generated in the process of the flowchart of FIG. 2 and which show a typical threshold curve for a binarization program.

An example of a two-dimensional histogram which is generated based upon the gray scale image data 42 is shown in FIG. 3. Light areas on the histogram correspond to a heavy concentration of pixels and dark areas on the histogram correspond to a low concentration of pixels. For gray scale images of checks, it can be hypothesized that the two-dimensional histogram will contain two clusters 52, 54 of heavy concentrations of pixels. One cluster 52 represents the background pixels and is usually located as a blob in the upper half of the histogram. The other cluster 54 represents the foreground pixels and is usually located as another blob in the lower half of the histogram.

After the two-dimensional histogram of FIG. 3 is generated in step 104, the well known k-means (sometimes known as c-means) clustering algorithm is applied to the histogram with a cluster number set at two and with a constraint that one cluster (i.e., the background cluster 52) needs to be above the other cluster (i.e., the foreground cluster 54). The k-means clustering algorithm returns the center 53 of the background cluster 52 and center 55 of the foreground cluster 54, as shown in step 106. If desired, it is contemplated that vertical and horizontal projections may be used to determine the initial cluster center parameters. A threshold curve 70 associated with the binarization program 44 is also shown in FIG. 3.

After the centers 53, 55 of the background and foreground clusters 52, 54 are determined in step 106, the threshold curve 70 is parameterized in accordance with the present invention as described in detail hereinbelow.

Figure 4:
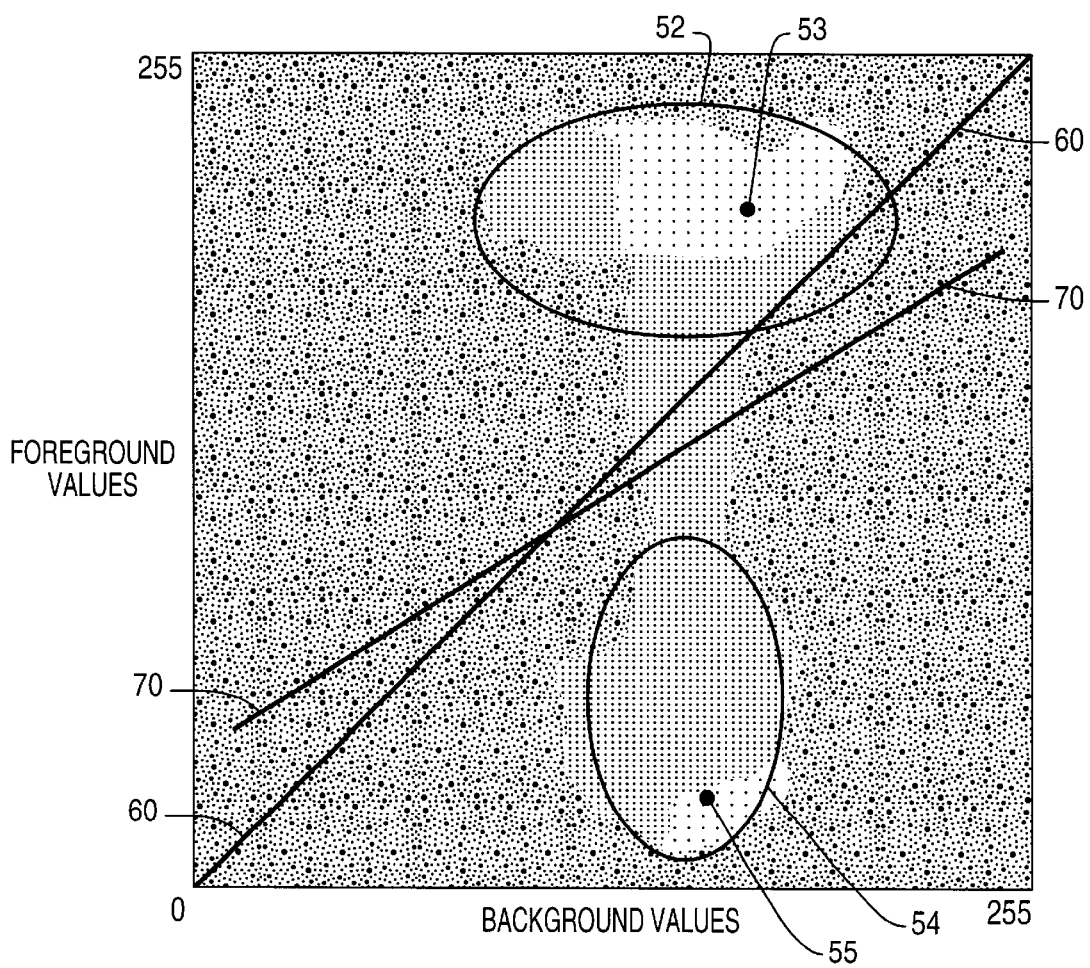
FIG. 4 is a histogram similar to FIG. 3 and showing addition of a diagonal line.

In step 108, a diagonal line 60 is drawn between the point (0, 0) and the point (255, 255), as shown in FIG. 4. Then, in step 110, the diagonal line 60 is followed from point (0, 0) along the diagonal line until a non-zero point in the histogram is reached, such as point "A" shown in FIG. 5. Similarly, in step 112, the diagonal line 60 is followed from point (255, 255) along the diagonal line until a non-zero point in the histogram is reached, such as point "C" shown in FIG. 5.

Figure 5:
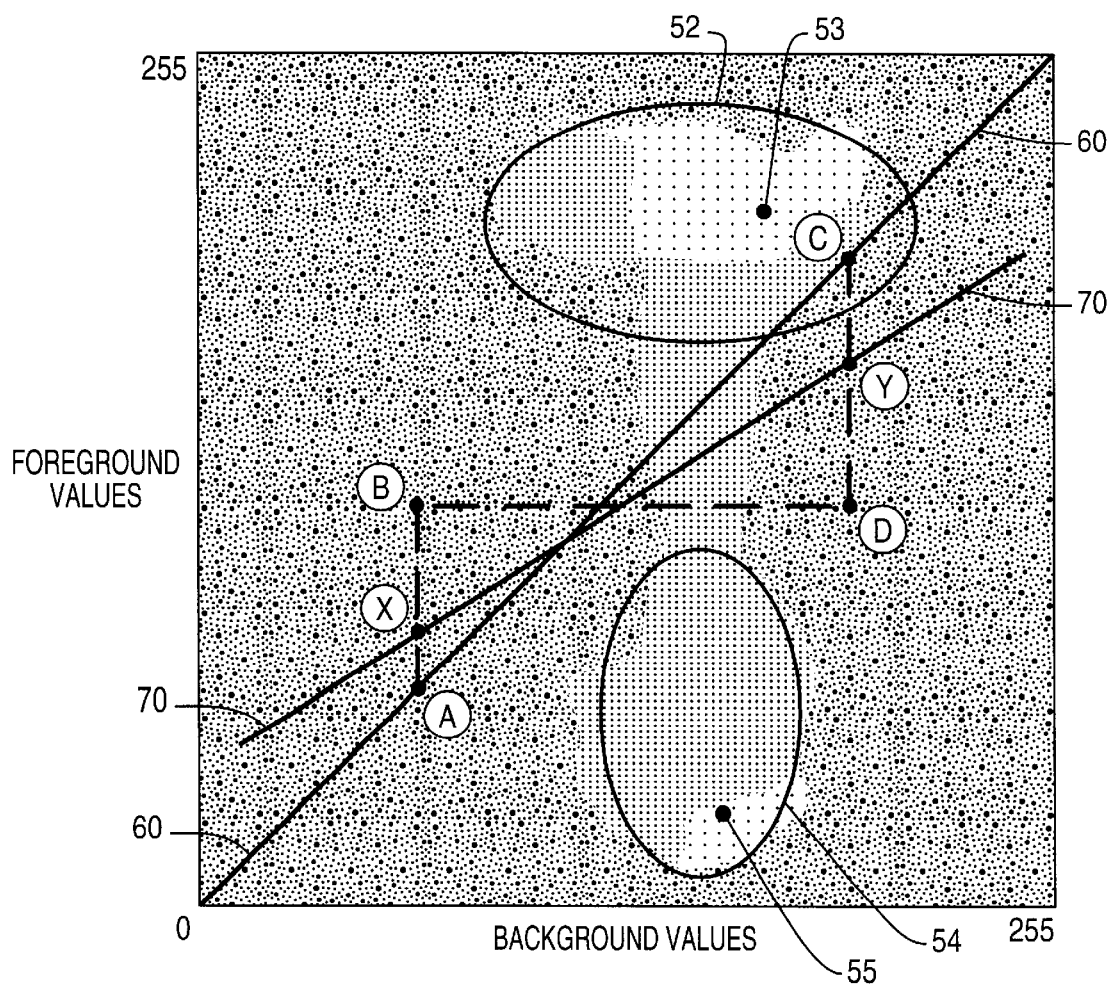
FIG. 5 is a histogram similar to FIG. 4 and showing addition of two vertically projected lines and a horizontal line interconnecting the two vertically projected lines for constructing a parameterized threshold curve in accordance with the present invention.

The process proceeds to step 114 in which the average between foreground values of point "A" found in step 110 and point "C" found in step 112 is calculated. This average is shown in FIG. 5 at the level of the horizontal dashed line which extends through point "B" and point "D". Then, in step 116, a vertical line is drawn between point "A" and point "B" along the same background value, as shown by a vertical dashed line in FIG. 5. It should be noted that the vertical dashed line extending between point "A" and point "B" intersects the threshold curve 70 at point "X", as shown in FIG. 5. Similarly, in step 118, a vertical line is drawn between point "C" and point "D", as shown by a vertical dashed line in FIG. 5. It should be noted that the vertical dashed line extending between point "C" and point "D" intersects the threshold curve 70 at point "Y", as shown in FIG. 5.

Figure 6:
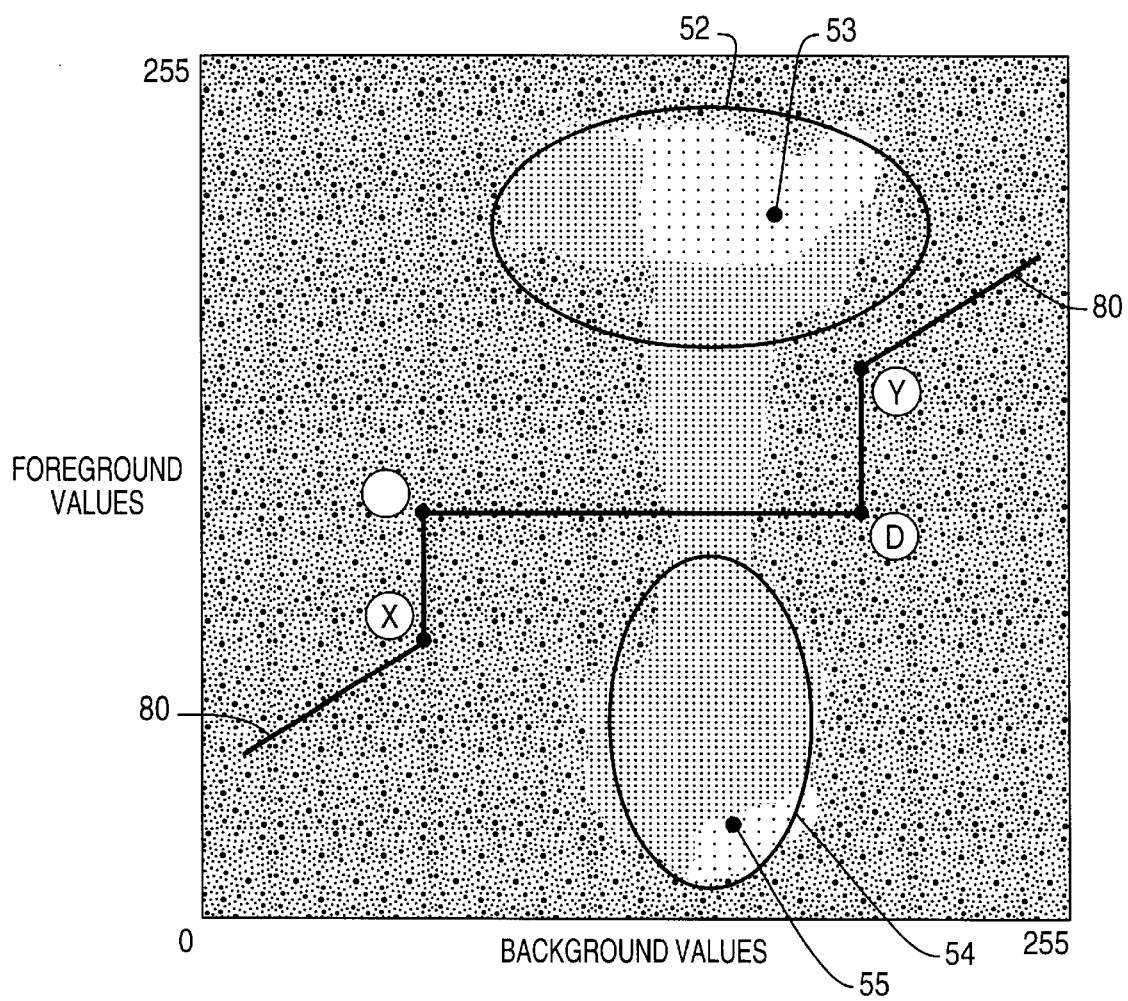
FIG. 6 is a histogram showing the parameterized threshold curve constructed from the lines in the histogram of FIG. 5.

Then, in step 120, a solid horizontal line is drawn between point "B" and point "D", as shown in FIG. 6, to provide a resulting parameterized threshold curve 80. It should be apparent that the parameterized threshold curve 80 shown in FIG. 6 comprises end portions of the original threshold curve 70 shown in FIG. 5 which are interconnected by the new horizontal portion which extends between point "B" and point "D" as shown in FIG. 6. A short solid vertical line is drawn between point "B" and point "X", and another short solid vertical line is drawn between point "D" and point "Y" to "complete" the parameterized threshold curve 80 shown in FIG. 6.

A number of advantages result by parameterizing the threshold curve for the binarization program 44 as described hereinabove. One advantage is that computational costs are minimized. Computation costs are minimized because the binarization program 44 is not applied to the gray scale image data 42 associated with the check 12 to produce the corresponding binary image of the check until the threshold curve associated with the binarization program 44 is parameterized to optimize performance of the binarization program 44. Accordingly, an improved binarized image of the check 12 is provided.

The above description describes one way of parameterizing the threshold curve associated with the particular binarization program 44. It is contemplated that there will be many variations and many different ways of parameterizing the threshold curve in accordance with the present invention. For example, it is contemplated that points other than (0, 0) and (255, 255) could have been selected as the starting point to begin parameterizing the original threshold curve 70. As another example, it is contemplated that a line other than the diagonal line 60 could have used. Still as another example, it is contemplated that only certain segments of the original threshold curve 70 could have been parameterized, or that different segments of the original threshold curve could have been parameterized in different ways.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of processing a document, the method comprising the steps of:
   (a) scanning a document to obtain gray scale image data associated with the document;
   (b) generating a two-dimensional histogram based upon the gray scale image data obtained in step (a);
   (c) applying a clustering algorithm to the two-dimensional histogram to determine a set of cluster center parameters associated with a first cluster of pixels and a set of cluster center parameters associated with a second cluster of pixels;
   (d) parameterizing a threshold curve associated with a binarization program based upon the set of cluster center parameters associated with the first cluster of pixels and the set of cluster center parameters associated with the second cluster of pixels; and
   (e) applying the binarization program to the gray scale image data associated with the document using the parameterized threshold curve obtained in step (d) to provide a binarized image data representative of a binary image of the document.

2. A method according to claim 1, wherein step (d) includes the steps of:
   (d-1) calculating an average value associated with the first and second clusters of pixels; and
   (d-2) parameterizing at least a portion of the threshold curve based upon the average value calculated in step (d-1).

3. A method according to claim 1, wherein the clustering algorithm includes a k-means clustering algorithm.

4. A method according to claim 1, wherein one cluster of pixels is representative of background of the document and the other cluster of pixels is representative of foreground of the document.

5. A method according to claim 1, wherein one cluster of pixels is located above the other cluster of pixels.

6. A method according to claim 5, wherein the above cluster of pixels is representative of background of the document and the other cluster of pixels is representative of foreground of the document.

7. An apparatus for processing document, the apparatus comprising:
   means for scanning the document to obtain gray scale image data associated with the document;
   means for generating a two-dimensional histogram based upon the gray scale image data;
   means for applying a clustering algorithm to the two-dimensional histogram to determine a set of cluster center parameters associated with a first cluster of pixels and a set of cluster center parameters associated with a second cluster of pixels;
   means for parameterizing a threshold curve associated with a binarization program based upon the set of cluster center parameters associated with the first cluster of pixels and the set of cluster center parameters associated with the second cluster of pixels; and
   means for applying the binarization program to the gray scale image data associated with the document using the parameterized threshold curve to provide a binarized image data representative of a binary image of the document.

8. An apparatus according to claim 7, wherein the means for parameterizing a threshold curve includes means for calculating an average value associated with the first and second clusters of pixels and means for parameterizing at least a portion of the threshold curve based upon the calculated average value.

9. An apparatus according to claim 7, wherein the clustering algorithm includes a k-means clustering algorithm.

10. An apparatus according to claim 7, wherein one cluster of pixels is representative of background of the document and the other cluster of pixels is representative of foreground of the document.

11. An apparatus according to claim 7, wherein one cluster of pixels is located above the other cluster of pixels.

12. An apparatus according to claim 11, wherein the above cluster of pixels is representative of background of the document and the other cluster of pixels is representative of foreground of the document.

* * * * *